US012568378B2

(12) United States Patent
Munn et al.

(10) Patent No.: US 12,568,378 B2
(45) Date of Patent: Mar. 3, 2026

(54) SYSTEM AND METHOD FOR VALIDATING AUTHORITY OF DEVICE BASED ON IP ADDRESS

(71) Applicant: Verizon Patent and Licensing Inc., Basking Ridge, NJ (US)

(72) Inventors: Jude M. Munn, Pittsburg, CA (US); Keefe Leiter, Waxhaw, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 298 days.

(21) Appl. No.: 18/162,011

(22) Filed: Jan. 31, 2023

(65) Prior Publication Data

US 2024/0259805 A1 Aug. 1, 2024

(51) Int. Cl.
| | |
|---|---|
| *H04W 12/72* | (2021.01) |
| *H04L 9/40* | (2022.01) |
| *H04W 12/06* | (2021.01) |
| *H04W 12/088* | (2021.01) |
| *H04W 12/121* | (2021.01) |

(52) U.S. Cl.
CPC ......... *H04W 12/72* (2021.01); *H04L 63/0236* (2013.01); *H04L 63/101* (2013.01); *H04W 12/06* (2013.01); *H04W 12/088* (2021.01); *H04W 12/121* (2021.01)

(58) Field of Classification Search
CPC ... H04W 12/72; H04W 12/06; H04W 12/088; H04W 12/121; H04L 63/0236; H04L 63/101
See application file for complete search history.

(56) References Cited

U.S. PATENT DOCUMENTS

| | | | | |
|---|---|---|---|---|
| 11,184,356 B1* | 11/2021 | Tandon | ................ | H04L 67/141 |
| 2005/0122930 A1* | 6/2005 | Zhao | .................... | H04L 63/0209 |
| | | | | 713/168 |
| 2007/0268888 A1* | 11/2007 | Shatzkamer | ........ | H04L 63/0892 |
| | | | | 370/352 |
| 2017/0230832 A1* | 8/2017 | Ophir | .................... | H04W 12/06 |
| 2018/0375953 A1* | 12/2018 | Casassa Mont | .... | H04L 61/5014 |
| 2019/0253388 A1* | 8/2019 | Verma | .................... | H04L 63/20 |
| 2019/0281040 A1* | 9/2019 | Dhamankar | ....... | G06Q 20/4014 |

(Continued)

OTHER PUBLICATIONS

Polčák, Libor; Holkovič, Martin; Matoušek, Petr; "A new approach for detection of host identity in IPV6 networks," International Conference on Data Communication Networking (DCNET), Reykjavik, Iceland, Jul. 29-31, 2013, IEEE, 7 pages.*

(Continued)

*Primary Examiner* — Victor Lesniewski

(57) ABSTRACT

A system includes one or more network devices. The network devices are configured to: poll one or more devices to obtain a list of Internet Protocol (IP) addresses of User Equipment devices (UEs) that are authorized to access a network; obtain identifier-IP address pairs based on the IP addresses and identifiers (IDs) of the UEs; receive a request from a UE to connect to the network; and use an IP address of the UE to look up a device ID of the UE in the ID-IP address pairs. If the device ID of the UE is in a list of IDs of the UEs, the network devices are configured to permit the UE to establish a connection to the network. Otherwise, the network devices are configured to prevent the UE from establishing a connection to the network.

20 Claims, 8 Drawing Sheets

(56) References Cited

U.S. PATENT DOCUMENTS

| | | | |
|---|---|---|---|
| 2020/0162429 A1* | 5/2020 | Burakovsky | ........ H04W 12/088 |
| 2021/0184967 A1* | 6/2021 | Patil | ........................ H04L 45/22 |
| 2023/0100395 A1* | 3/2023 | Yadav | ................... H04W 12/72 |
| | | | 370/392 |
| 2025/0023958 A1* | 1/2025 | Hu | ........................ H04L 67/303 |
| 2025/0168635 A1* | 5/2025 | Stojanovski | ...... H04W 12/0433 |

OTHER PUBLICATIONS

Perkins, C.E.; "Mobile IP joins forces with AAA," IEEE Personal Communications, vol. 7, No. 4, Aug. 2000, pp. 59-61.*

* cited by examiner

700

SEND/RECEIVE TRUSTED DEVICE IDS
702

POLL ACS; STORE ID-IP PAIRS
704

SEND ID-IP PAIRS THROUGH CASCADE OF COMPONENTS
706

PERFORM SECURITY TASKS BASED ON ID-IP PAIRS
708

BUILD CONNECTED IP LIST
710

SEND CONNECTED IPS OVER CASCADE OF COMPONENTS
712

UPDATE CONNECTED & DISCONNECTED DEVICE LIST
714

PERFORM SECURITY ACTIONS
716

SYSTEM AND METHOD FOR VALIDATING AUTHORITY OF DEVICE BASED ON IP ADDRESS

BACKGROUND INFORMATION

Cyber security is important for organizations that conduct their transactions over networks. Having a network presence exposes the organizations to attempts to obtain unauthorized access, cause denial-of-services, and/or steal information. Such organizations typically implement, for example, firewalls, intrusion detection systems, password protection schemes, encryption, secure protocols, and other schemes to defend against network attacks. Each of such schemes protects the networks in different ways.

DETAILED DESCRIPTION OF EXAMPLE EMBODIMENTS

The following detailed description refers to the accompanying drawings. The same reference numbers in different drawings may identify the same or similar elements. As used herein, the term "out-of-band channel" may refer to a communication channel that is not part of a data channel or a protocol data unit (PDU) session. An out-of-band channel may be established over a wireless link between a mobile device and a network.

Systems and methods described herein relate to validating authorities of devices to access a network or a portion of the network (e.g., a data center) based on their Internet Protocol (IP) addresses. More specifically, the systems and methods relate to a network device obtaining an IP address of a device external to the network. When the external device attempts to access the network, the network device may determine whether the external device has the authority to access the network based on the IP address of the external device.

Figure 1:
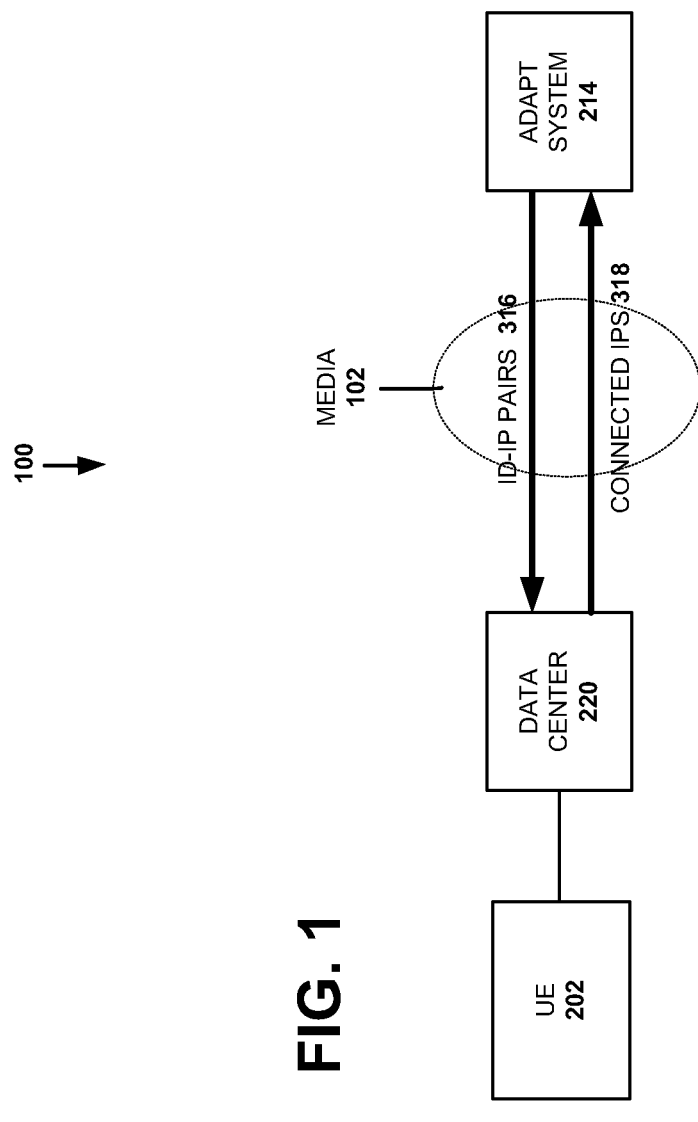
FIG. 1 illustrates concepts described herein.

FIG. 1 illustrates the concept described herein. As shown, a network environment 100 includes a User Equipment device (UE) 202 (e.g., a Fixed Wireless Access device, a customer premises equipment (CPE) device, etc.), a data center 220, and an Assigned Device Address Polling and Tracking (ADAPT) system 214. ADAPT system 214 may obtain and send, to data center 220, device identifier-IP address pairs 316 (herein referred to as ID-IP pairs 316). Each ID-IP pair 316 includes an IP address for each device that data center 220 has identified as having the authority to access data center 220. When UE 202 attempts to connect to data center 220, data center 220 obtains an IP address of UE 202 and looks up the IP address in the ID-IP address pairs 316 received from ADAPT system 214. If the lookup returns an ID of a device that is authorized to access data center 220, data center 220 knows that UE 202 is the device. Accordingly, data center 220 may permit UE 202 to establish a connection with data center 220 and access data center 220. Otherwise, data center 220 may deny access to UE 202.

In some implementations, periodically or on demand, data center 220 may forward, to ADAPT system 214, a list of IP addresses 318 (shown as connected IPs 318 in FIG. 1) of UEs 202 that are connected to and accessing data center 220. In response, ADAPT system 214 may use the list of connected IPs 318 to construct a table of authorized UEs 202 that are connected to data center 220 and a table of authorized UEs 202 that are not connected to data center 220. If the number of disconnected UEs 202 exceeds a threshold, ADAPT system 214 may notify a data center administrator to indicate a potential network problem (e.g., a security problem or a connectivity problem).

Figure 2:
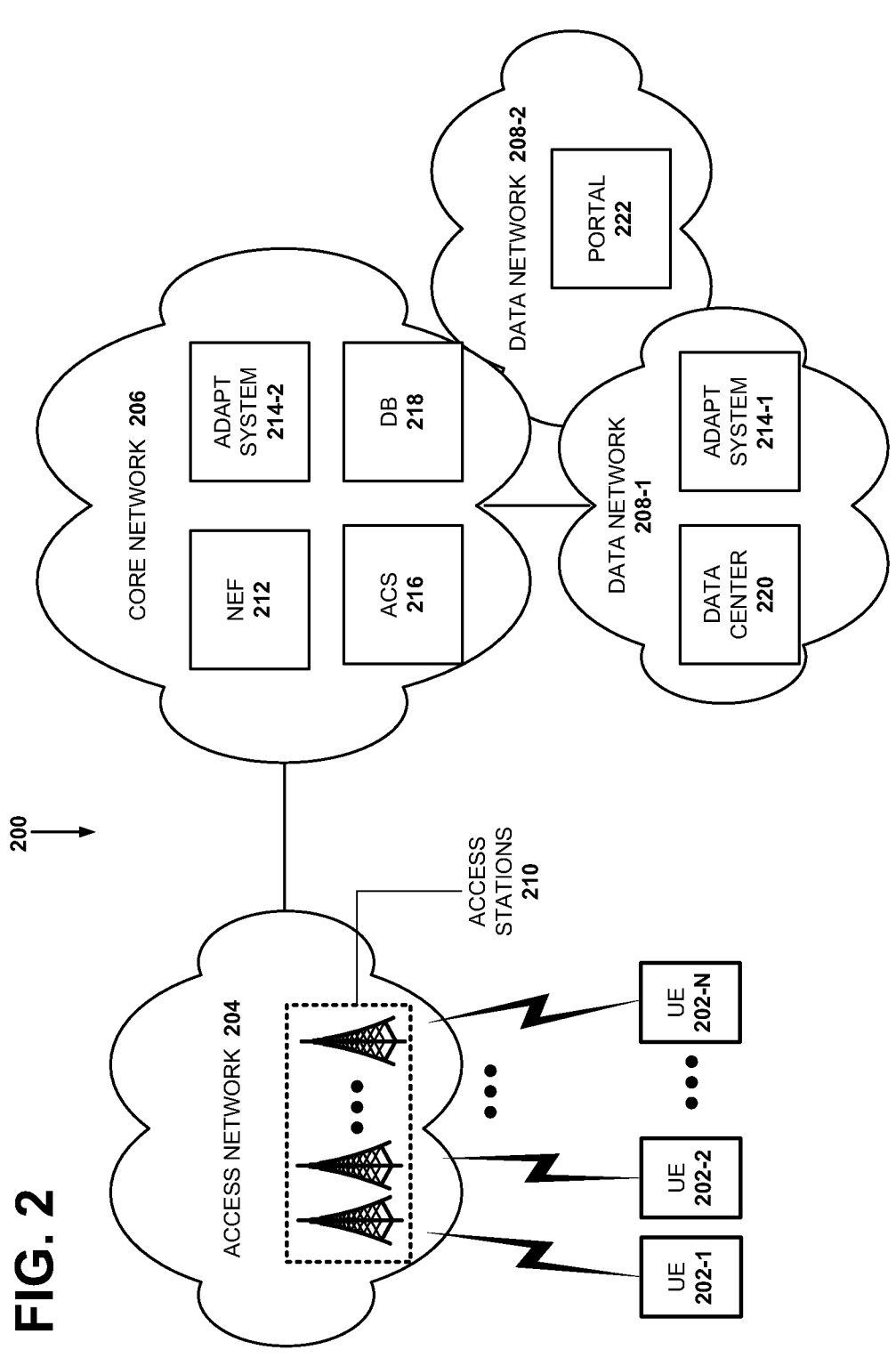
FIG. 2 illustrates an exemplary network environment in which systems and methods described herein may be implemented.

FIG. 2 illustrates an exemplary network environment 200 in which the system and methods may be implemented. As shown, environment 200 may include UEs 202-1 through 202-N (collectively referred to as UEs 202 and generically referred to as UE 202), an access network 204, a core network 206, and data networks 208-1 and 208-2 (collectively referred to as data networks 208 and generically as data network 208). Access network 204, core network 206, and data networks 208 may be part of a provider network.

UEs 202 may include wireless communication devices capable of cellular communication, such as Fourth Generation (4G) (e.g., Long-Term Evolution (LTE)) communication and/or Fifth Generation (5G) New Radio (NR) communication. Examples of UE 202 include: a FWA device; a CPE device; a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IoT) device with Wi-Fi® capabilities. In some implementations, UE 202 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices. When UE 202 registers with the provider network, the provider network may assign an IP address to UE 202.

In some embodiments, UE 202 may be implemented as a FWA that includes a broadband device (e.g., 4G or 5G base station-like device or a mobile terminal for 4G or 5G communication for RF communication with the provider network) and a Wi-Fi® device (e.g., a wireless router, customer premises equipment (CPE), etc.). The FWA may use the broadband device to communicate with the provider network and use the Wi-Fi® device to communicate with other UEs 202.

In some embodiments, a set of UEs 202 may be capable of accessing a common data center 220. To access data center 220, each UE 202 may request data center 220 for a connection. During the connection process, each UE 202 may indicate, to data center 220, the IP address assigned to the UE 202 by the provider network.

Access network 204 may allow UE 202 to access core network 206. To do so, access network 204 may establish and maintain, with participation from UE 202, an over-the-air channel with the customer devices; and maintain backhaul channels with core network 206. Access network 204 may relay information through such channels, from UEs 202 to core network 206 and vice versa. Access network 204 may include an LTE radio network and/or a 5G NR network, or another advanced radio network. These networks may include many central units (CUs), distributed units (DUs), radio units (RUs), and wireless stations, some of which are illustrated in FIG. 2 as access stations 210 (generically referred to as access station 210) for establishing and maintaining over-the-air channel with UEs 202. Access station 210 may include a 4G, 5G, or another type of base station (e.g., eNB, gNB, etc.) that comprises one or more RF transceivers. In some implementations, access station 210 may be part of an evolved Universal Mobile Telecommunications Service (UMTS) Terrestrial Network (eUTRAN).

Core network 206 may include one or more devices and network components for providing communication services to UEs 202. For example, core network 206 may permit UEs 202 to attach to the provider network, establish sessions with devices in the provider network, and/or receive services from the provider network (e.g., access data center 220, receive content, access the Internet, conduct video conferences with other UEs 202 attached to the provider network, etc.). To deliver various services, core network 206 may interface with other networks, such as data networks 208.

Depending on the implementation, core network 206 may include 5G core network components (e.g., a User Plane Function (UPF), an Application Function (AF), an Access and Mobility Function (AMF), a Session Management Function (SMF), a Unified Data Management (UDM) function, a Unified Data Repository (UDR), a Network Slice Selection Function (NSSF), a Policy Control Function (PCF), etc.); 4G or LTE core network components (e.g., a Serving Gateway device (SGW), a Packet data network Gateway device (PGW), a Mobility Management Entity (MME), etc.); and/or other types of core network components.

Data networks 208-1 and 208-2 each may include one or more networks connected to core network 206. In some implementations, a particular data network 208 may be associated with a data network name (DNN) in 5G and/or an Access Point Name (APN) in 4G. UE 202 may request a connection to data network 208 using a DNN or APN. Each data network 208 may include, and/or be connected to and enable communication with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application). An application may provide services for a program or an application running on UEs 202 and may establish communication sessions with UEs 202 via core network 206.

As further shown in FIG. 2, core network 206 and data networks 208 may include network components of the systems for validating authorities of UEs 202 to access data network 208-1 and/or data center 220 based on IP addresses of the UEs 202. The systems may include a Network Exposure Function (NEF) 212, ADAPT systems 214-1 and 214-2, an autoconfiguration server (ACS) 216, a database 218, a data center 220, and a portal 222. Although core network 206 and data networks 208-1 and 08-2 may include other components of the system, for clarity, they are not illustrated.

NEF 212 includes a network function that may expose component capabilities and events internal to core network 206 and/or data network 208 to devices and network functions external to core network 206, including third party network functions. That is, NEF 212 may permit a device or a component external to core network 206 to access network functions, programs, or devices in core network 206.

Each of ADAPT systems 214-1 and 214-2 (collectively referred to as ADAPT systems 214 and generically as ADAPT system 214) may determine, given a list of device IDs, their corresponding IP addresses. ACS 216 may manage certain types of UEs 202 (e.g., customer premises equipment (CPE) devices and/or FWAs). For example, ACS 216 may assign a set of IP addresses to UEs 202, query UEs 202 for operational parameters, and/or maintain a database of information about UEs 202. A network component may query ACS 202 for information about the UEs 202 via a set of Application Programming Interfaces (APIs). For example, a device may query ACS 316 to provide IP addresses for a list of UEs 202.

Database 218 may store a table of device identifiers (IDs) (e.g., identifiers of UEs 202) and their corresponding IP addresses. Examples of device IDs include: Media Access Control (MAC) addresses; International Mobile Subscriber Identities (IMSIs); Mobile Subscriber-Integrated Services Digital Networks (MSISDNs); etc.). Database 218 (referred to as DB 218 in FIG. 2) may also store a table of IP addresses which belong to UEs 202 that are connected to a device (e.g., a firewall), a subnet, a data center 220, or a particular data network 208.

Data center 220 may host applications for rendering services and providing data to UEs 202. Data center 220 may have a list of IDs of UEs 202 that have the authority to receive particular services or the authority to access a particular set of data in data center 220. Portal 222 may include network components that serve as a gateway (e.g., an entry/exit point) through which UEs 202 may access resources of networks. Portal 222 may protect the networks from the UEs 202 accessing the networks via portal 222.

For clarity, FIG. 2 does not show all components that may be included in network environment 200 (e.g., routers, bridges, wireless access point, additional networks, additional access stations 210, NEFs 212, ADAPT systems 214, ACSs 216. Databases 218, data centers 220, portals 222, etc.). Depending on the implementation, network environment 200 may include additional, fewer, different, or a different arrangement of components than those illustrated in FIG. 2. Furthermore, in different implementations, the configuration of network environment 200 may be different.

Figure 3:
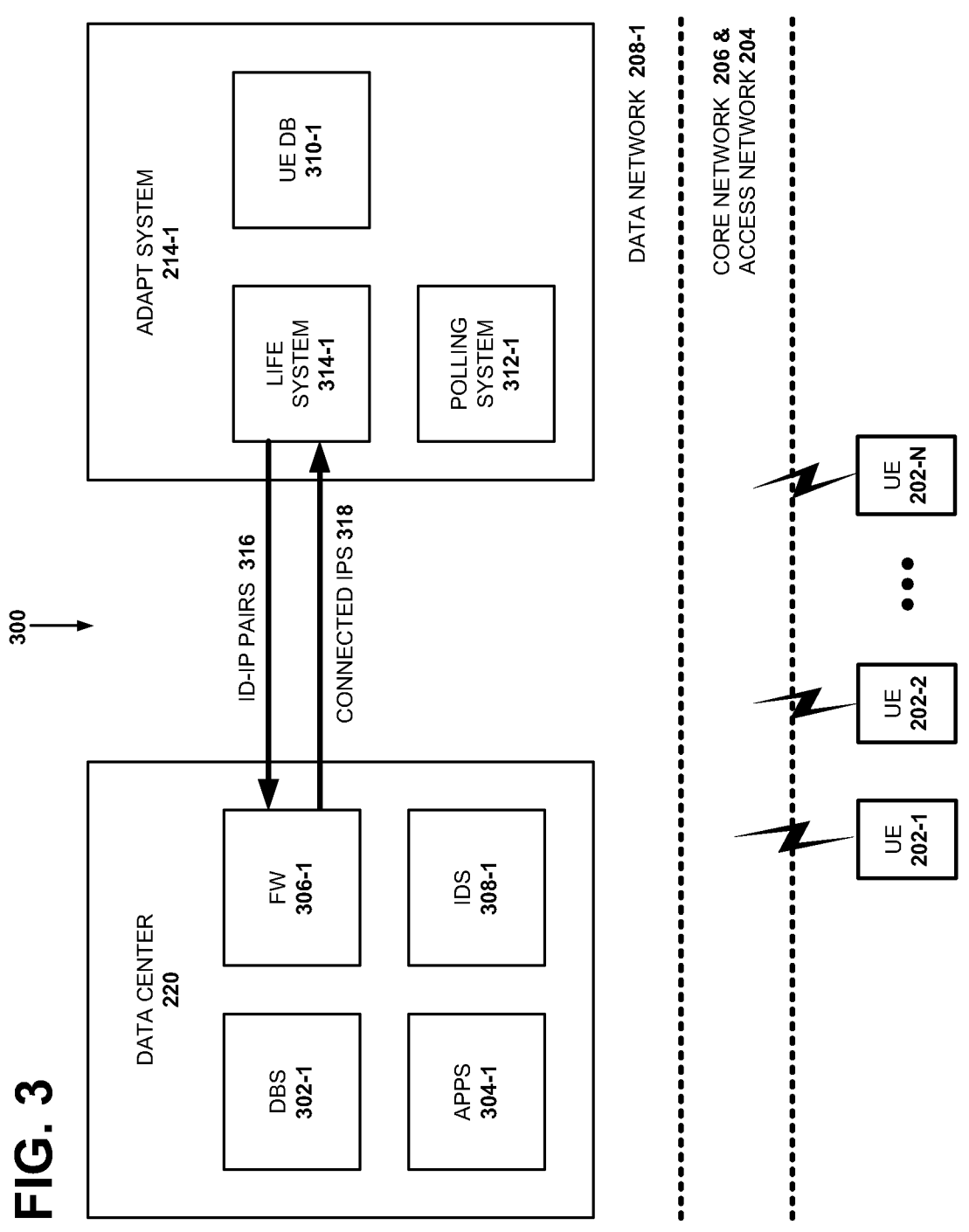
FIG. 3 illustrates example components of a system for validating an authority of a device to access a network based on an Internet Protocol (IP) address, according to an implementation.

FIG. 3 illustrates example components of a system 300 for validating an authority of a device to access data center 220 based on an IP address, according to an implementation. As shown, system 300 may include: data center 220, which may comprise databases (DBs) 302-1, applications 304-1, a firewall 306-1, and an Intrusion Detection System (IDS) 308-1; and ADAPT system 214-1, which may comprise a UE database 310-1, a polling system 312-1, and a Live Identity Filtering and Exporting (LIFE) system 316-1. Although system 300 may include additional, fewer, different, or a different arrangement of components, for clarity, they are not illustrated in FIG. 3.

Databases 302-1 may store data that UEs 202 may access. Examples of data stored at databases 302-1 include: content (e.g., video or audio); financial data; personal data; property data; and health history. Applications 304-1 may provide services to UEs 202 that connect to data center 220. Examples of the services include: a computational service (e.g., graphics rendering); a transaction service (e.g., a financial transaction, commercial transaction, etc.); a communication service (e.g., a video conferencing service, a phone service, etc.); and a real-time service.

Firewall 306-1 (shown in FIG. 3 as FW 306-1) may be implemented on a hardware device or as software on a hardware device. Firewall 306-1 may act as a gateway device that protects data network 208-1 or data center 220 against unauthorized access from devices external to the provider network. Two or more of firewall 306-1 may be located at particular logical locations in the provider network to create demilitarized zones. The demilitarized zones may prevent untrusted data from being injected into data network 208-1 or data center 220.

Firewall 306-1 may recognize a set of source IP addresses whose UEs 202 external to data network 208-1 or data center 220 may be permitted to reach network components internal to data network 208-1 or data center 220, such as databases 302-1 and/or applications 304-1. Such IP addresses may be referred to as trusted IP addresses. Firewall 306-1 may recognize a trusted IP address by looking up the IP address in a table of trusted device ID-IP address pairs (herein also referred to simply as ID-IP pairs). Depending on the implementation, firewall 306-1 may be configured to pull ID-IP pairs from or receive ID-IP pairs pushed from another network component.

Firewall 306-1 may also recognize a set of source IP addresses whose UEs 202 externals to data network 208-1 and/or data center 220 may be denied access to data network 208-1 and/or data center 220. When firewall 306-1 receives a connection request from UE 202 with a trusted or an untrusted IP address, firewall 306-1 may apply one or more rules to either permit or block the UE 202 from accessing data network 208-1 or data center 220. Depending on the implementation, firewall 306-1 may be configured to push, to another network component, a list of source IP addresses whose UEs 202 have live connections to data network 208-1 or data center 220; or alternatively, to send the list to a network component pulling the list.

IDS 308-1 may detect security threats from network components external to data network 208-1 and/or data center 220. IDS 308-1 may analyze packets from the external devices by performing what is referred to as deep packet inspection. IDS 308-1 may monitor network traffic from various devices, including UEs 202.

UE database 310-1 may include tables and/or lists of the following: trusted device IDs; ID-IP pairs; connected IPs (a list of source IP addresses whose UEs 202 are currently connected to data network 208-1 or data center 220); a list connected devices (a list of IDs) of trusted devices currently connected to data network 208-1 and/or data center 220; and/or a list of source IP addresses of trusted UEs 202 that are currently disconnected from data network 208-1 or data center 220.

Figure 4:
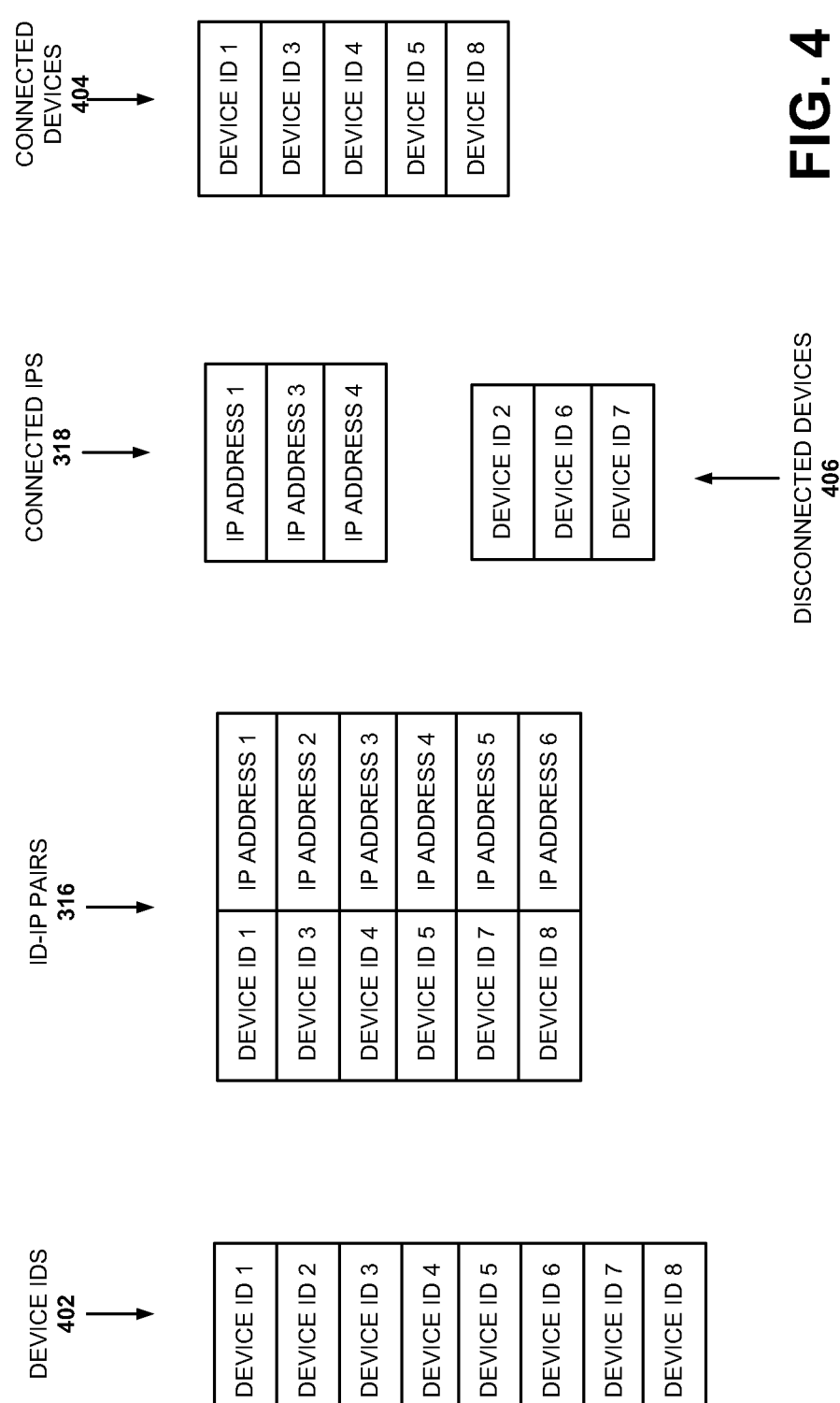
FIG. 4 shows example tables that may be included in a User Equipment (UE) database, according to an implementation.

FIG. 4 shows example tables of trusted device IDs 402, ID-IP pairs 316, connected IPs 318, connected devices 404, and disconnected devices 406 stored at UE database 310-1, according to an implementation. As shown, trusted device IDs 402 (also referred to simply as device IDs 402) may include information (identifiers) that identifies trusted UEs 202. As discussed above, each device ID may include one or more of: a MAC address; an IMSI; and/or a MSISDN. Trusted device IDs 402 may have been provided to UE database 310-1 by a network administrator or another network component. In the example of FIG. 4, device IDs include devices IDs 1 through 8. ID-IP pairs 316 may include pairs of a device ID and an IP address assigned by the provider network to the device with the device ID. Each of the device IDs in ID-IP pairs 316 may be included in the trusted device IDs 402. In FIG. 4, device IDs of ID-IP pairs 316 include device IDs 1, 3, 4, 5, 7, and 8. The corresponding IP addresses for the device IDs include IP addresses 1, 2, 3, 4, 5, and 6, respectively.

Connected IPs 318 include IP addresses of UEs 202 that are identified in the trusted device IDs 402 and recently connected to data network 208-1 and/or data center 220 (e.g., connected within a time window of 5 minutes, 10 minutes, 1 hour, etc.). In FIG. 4, connected IPs 318 include IP addresses 1, 3, and 4. Connected devices 404 include a list of device IDs of UEs IDs that both trusted and are currently connected to data network 208-1 and/or data center 220. Connected devices 404 not only include IDs of UEs 202 whose IP addresses are included connected IPs 318, but also the IDs of UEs 202 with older connections to data network 208-1 and/or data center 220. In the example of FIG. 4, connected devices 404 include device IDs 1, 3, 4, 5, and 8. Disconnected devices 406 include IDs of UEs 202 identified in trusted device IDs 402 but are not currently connected to data network 208-1 and/or data center 220. In FIG. 4, disconnected devices include device IDs 2, 6, and 7.

Referring back to FIG. 3, polling system 312-1 may include network devices and/or components that poll other devices or components in network environment 200 to obtain IP addresses of UEs 202 that have been connected to, are connecting to, or are connected to data network 208-1 and/or data center 220.

In some implementations, polling system 312-1 may apply the Simple Network Management Protocol (SNMP) to poll UEs 202 that are identified in trusted device IDs 402 (e.g., obtained from UE database 310) and which are attached to access network 204 and/or core network 206. The polling may be performed out-of-band at regular time intervals (e.g., every 5 minutes, every 10 minutes, every 1 hour, etc.). By polling UEs 202 identified in the trusted device IDs 402, polling system 312-1 may obtain IP addresses, of the UEs 202, which have been assigned by access network 204 and core network 206. Furthermore, polling system 312-1 may 1 may generate ID-IP pairs 316 based on the IDs of the UEs 202 and the obtained IP addresses. Polling system 312-1 may store the generated ID-IP pairs 316 in UE database 310-1. If a UE 202 is identified in the trusted device IDs 402 but is not registered or attached to access network 204 and core network 206, polling system 312-1 may be unable to obtain the corresponding IP address and thus the ID-IP pair 316 for the UE 202.

LIFE system 314-1 may retrieve ID-IP pairs 316 in UE database 310-1 and send the retrieved ID-IP pairs 316 to a network component (e.g., firewall 306-1), periodically or on demand. In addition, LIFE system 314-1 may receive a list of recently connected IPs 318 from a network component, periodically or on demand. LIFE system 314-1 may store the connected IPs 318 in UE database 310-1.

When LIFE system 314-1 obtains connected IPs 318, LIFE system 314-1 may use ID-IP pairs 316 and connected IPs 318 to build a list of connected devices 404 and a list of disconnected devices 406. In some implementations, where each connection may be long-lived, LIFE system 314-1 may obtain a list of recently disconnected IPs (not shown in FIG. 3) from a network component (e.g., firewall 306-1) and use the list of recently disconnected IPs to derive or verify connected devices 404 and disconnected devices 406.

Figure 5:
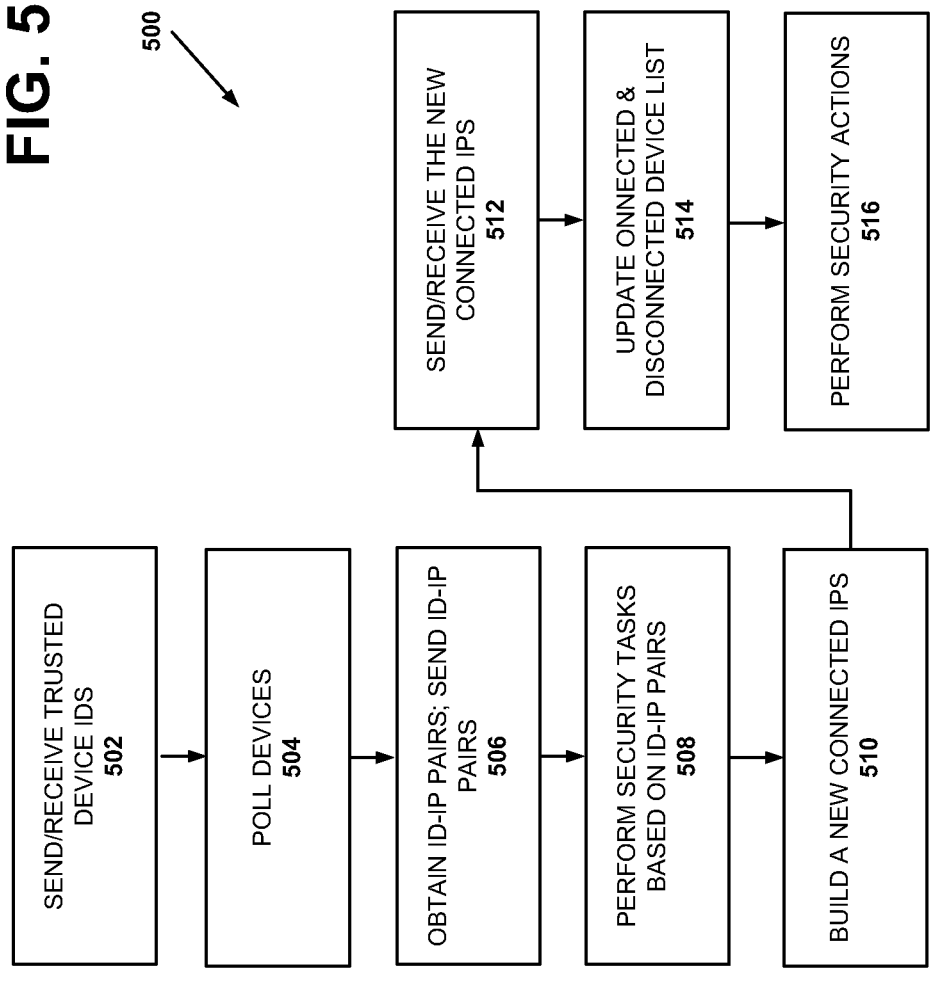
FIG. 5 shows a flow diagram of an example process that is associated with a system for validating an authority of a device to access a network based on an IP address, according to an implementation.

FIG. 5 shows a flow diagram of an example process 500 that is associated with system 300, according to an implementation. Process 500 may be performed by one or more of the components illustrated in FIG. 3. As shown, process 500 may include a network component or a network administrator sending trusted device IDs 402 to UE database 310-1, which may receive and store the trusted device IDs 402 (block 502).

Polling system 312-1 may obtain the trusted device IDs 402 and poll UEs 202, whose IDs are in trusted device IDs 402 (block 504). In one implementation, polling system 312-1 may 1 may apply the SNMP to poll UEs 202 that are attached to access network 204 and core network 206 through out-of-band channels over the wireless links to UEs 202. By polling UEs 202, polling system 312-1 may obtain the IP addresses that have been assigned to the UEs 202 by access network 204 and core network 206 at the time of UEs 202 registration. If a particular UE 202 is identified in trusted device IDs 402 but is not attached to access network 204 and core network 206, poling system 312-1 may be unable to reach the UE 202 and poll the UE 202 to obtain its IP address. Polling system 312-1 may aggregate the IP addresses of the polled UEs 202 and their IDs to generate ID-IP pairs 316 (block 506). Polling system 312-1 may store the generated ID-IP address pairs in UE database 310-1. Polling system 312-1 may repeat its polling and generating of IP-ID pairs 316 periodically or on-demand from other components.

Process 500 may further include sending ID-IP pairs 316 (block 506). For example, when LIFE system 314-1 determines that new ID-IP pairs 316 are available in UE database 310-1 or when LIFE system 314-1 receives a request for ID-IP pairs 316 from another network component, LIFE system 314-1 may retrieve the ID-IP pairs 316 from UE database 310-1 and forward ID-IP pairs 316 to the network component (block 506). LIFE system 314-1 may send ID-IP pairs 316 to, for example, firewall 306-1 or IDS 308-1 associated with data center 220. In another embodiment, LIFE system 314-1 may periodically check UE database 310-1 for updated ID-IP pairs 316 and forward the updated ID-IP pairs 316 to the network component.

Process 500 may further include performing security tasks based on the ID-IP pairs 316 (block 508). For example, when firewall 306-1 receives ID-IP pairs 316 from LIFE system 314-1, firewall 306-1 may use the ID-IP pairs 316 to validate whether a UE 202 is authorized to access data network 208-1 or data center 220 based on the ID-IP pairs 316. More specifically, firewall 306-1 may obtain the IP address of the UE 202 and use the IP address to look up its device ID in ID-IP pairs 316. If the device ID matches the ID of a UE 202 that is authorized to access data network 208-1 and/or data center 220, firewall 306-1 may permit the UE 202 to establish a connection with data center 220 (e.g., one of databases 302-1, one of applications 304-1, etc.) and access its data or services.

Process 500 may further include collecting connected IPs 402 (block 510). For example, when firewall 306-1 permits a UE 202 to connect to data network 208-1 or data center 220, firewall 306-1 may place the IP address of the UE 202 in a list of IPs 318 whose UEs 202 are connected to data network 208-1 and/or data center 220 (e.g., a new list since the previous transmission of connected IPs 318 to LIFE system 314-1). After collecting such IP addresses for a predetermined period of time, firewall 306-1 may forward the new connected IPs 318 to LIFE system 314-1 (block 512). When LIFE system 314-1 receives the new connected IPs 318, LIFE system 314-1 may store the new connected IPs 318 in UE database 310-1.

In addition to storing the new connected IP 318 in UE database 310-1, LIFE system 314-1 may use the ID-IP pairs 316 and the connected IPs 318 to update a list of connected devices (block 514) that are identified as the trusted devices. In addition, LIFE system 314-1 may use the trusted device IDs 402 and the list of connected devices 404 to obtain a list of disconnected devices 406 (block 514). In situations where trusted UEs 202 become disconnected from data network 208-1 or data center 220, firewall 306-1 may provide a list of new disconnected IPs to LIFE system 314-1, periodically or on demand. LIFE system 314-1 may use the disconnected IPs to refine or verify its list of disconnected devices 406.

LIFE system 314-1 may perform security tasks that are associated with aiding data network 208-1 and/or data center 220 to maintain their security (block 516). For example, if the number of disconnected devices 406 is large or increases too quickly, LIFE system 314-1 may 1 may alert a network administrator or a network component, to indicate a potential problem with network connections to data network 208-1 or data center 220.

Figure 6:
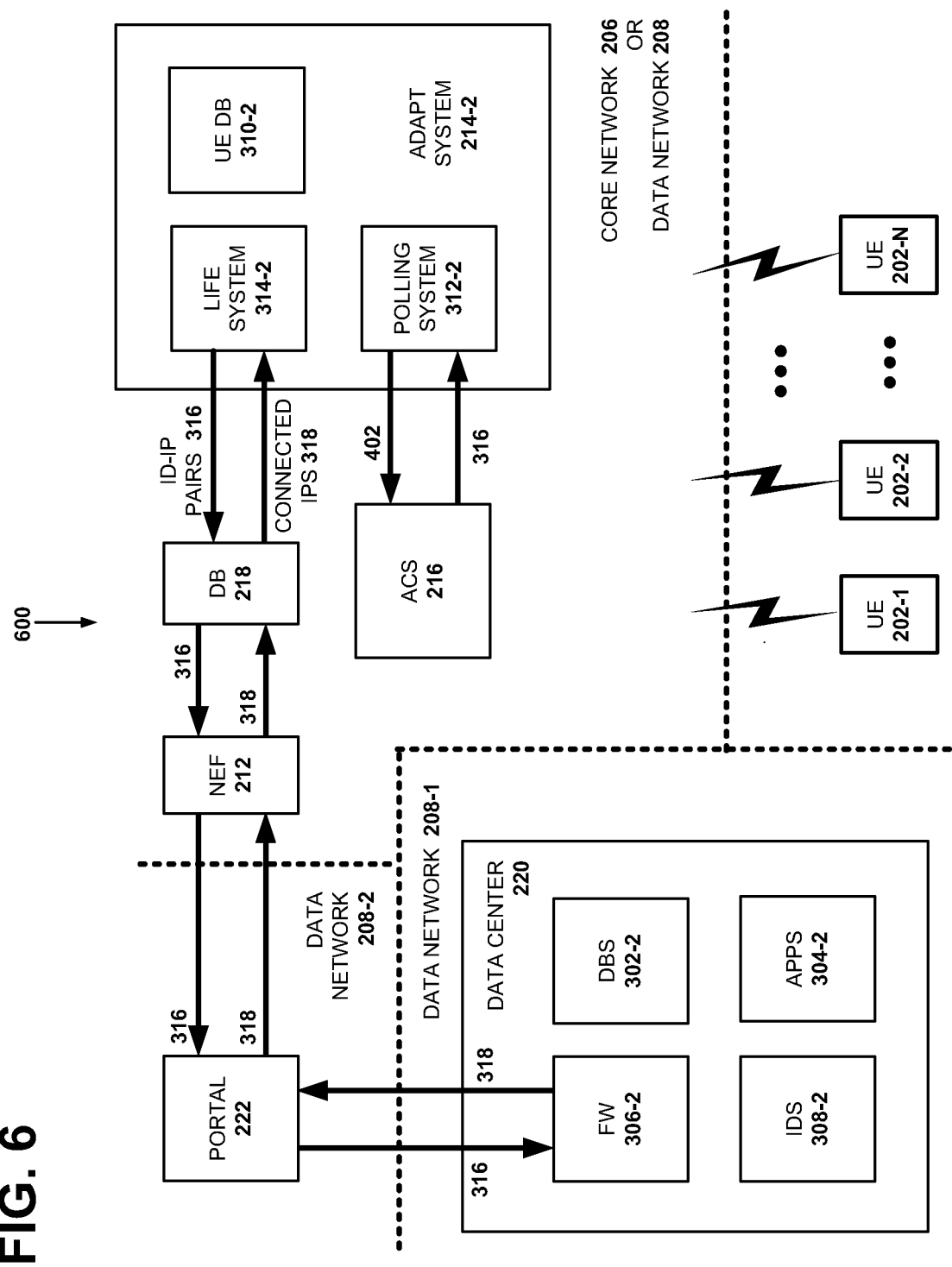
FIG. 6 illustrates example components of a system for validating an authority of a device to access a network based on an IP address, according to another implementation.

FIG. 6 illustrates example components of a system 600 for validating an authority of a device to access data network 208-1 and/or data center 220 based on an IP address, according to another implementation. As shown, system 600 may include: data center 220, which may comprise databases 302-2, applications 304-2, a firewall 306-2, and an IDS 308-2; ADAPT system 218-2, which may comprise a UE database 310-2, a polling system 312-2, and a LIFE system 316-2; ACS 216; and a cascade of components that include database 218, NEF 212, and portal 222. Although system 600 may include additional, fewer, different, or a different arrangement of components, for clarity, they are not illustrated in FIG. 6.

Databases 302-2, applications 304-2, firewall 306-2, and IDS 308-2 may be similar to and may operate similarly as databases 302-1, applications 304-1, firewall 306-1, and IDS 308-1 described above with reference to FIG. 3. In contrast to firewall 306-1, however, firewall 306-2 may receive ID-IP pairs 316 from LIFE system 314-2 through database 218, NEF 212, and portal 222 and not directly from LIFE system 314-2. Also in contrast to firewall 306-1, firewall 306-2 may send connected IPs 318 to LIFE system 314-2 through portal 222, NEF 212, and database 218 and not directly to LIFE system 314-2.

UE database 310-2, polling system 312-2, and LIFE system 314-2 may be similar to and may operate similarly as UE database 310-1, polling system 312-1, and LIFE system 314-1 described above with reference to FIG. 3. In contrast to polling system 312-1, however, polling system 312-2 may poll ACS 216 to obtain the IP addresses of UEs 202 that are identified by trusted device IDs 402 as having authorities to access data network 208-1 and/or data center 220. As described previously, ACS 216 may manage a set of UEs 202 that include the authorized UEs 202. After configuring UEs 202, ACS 216 may store configuration of the UEs 202 in its local database, including the IP addresses assigned to the UEs 202. When requested by polling system 312-2, ACS 216 may provide the ID-IP pairs 316 (those corresponding to trusted device IDs 402) to polling system 312-2.

Figure 7:
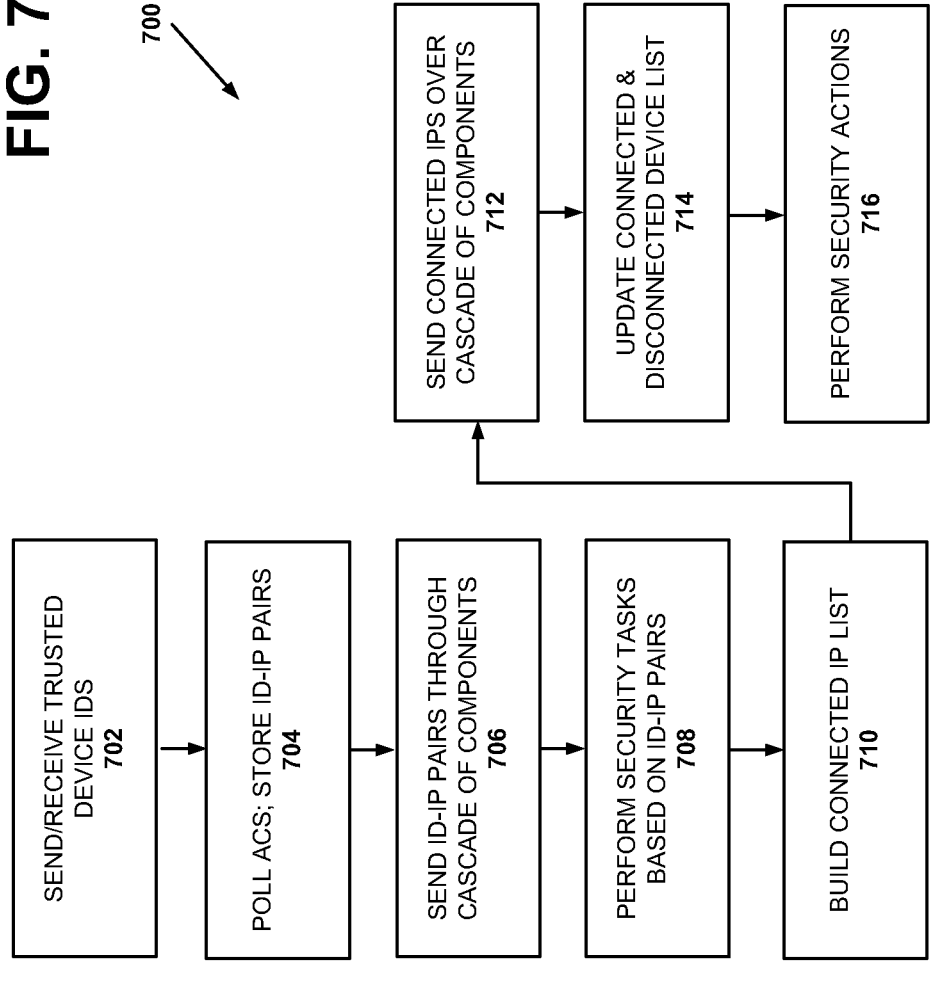
FIG. 7 shows a flow diagram of an example process that is associated with a system for validating an authority of a device to access a network based on an IP address, according to another implementation.

FIG. 7 shows a flow diagram of an example process 700 that is associated with system 600 for validating an authority of a device to access a network based on an IP address, according to another implementation. Process 700 may be performed by one or more of the components illustrated in FIG. 6. As shown, process 700 may include a network component or a network administrator sending trusted device IDs 402 to UE database 310-2, which may receive and store the trusted device IDs 402 (block 702). In contrast to UE database 310-1, UE database 310-2 may be included in core network 206 or in a data network 208 different from data network 208-1.

Polling system 312-2 may obtain the trusted device IDs 402 from UE database 310-2 and provide the device IDs 402 to ACS 216, for polling ACS 216 for IP addresses of UEs 202 that are identified by trusted device IDs 402 (block 704). Polling system 312-2 may obtain, from ACS 216, IP addresses that have been assigned to the UEs 202 by ACS 216 or access network 204 and core network 206 at the time of UEs 202 registration. Polling system 312-2 may obtain the IP addresses as part of ID-IP pairs 316 from ACS 216 and store the ID-IP pairs 316 in UE database 310-2 (block 704). Polling system 312-2 may repeat its polling ACS 216 and generating IP-ID pairs 316, periodically or on-demand from other components.

Process 700 may further include sending ID-IP pairs 316 (block 706). For example, when LIFE system 314-2 determines that new ID-IP pairs 316 are available in UE database 310-2 or when LIFE system 314-2 is requested by another network component, LIFE system 314-2 may retrieve the ID-IP pairs 316 from UE database 310-2 and forward ID-IP pairs 316 to the network component. through database 218, NEF 212, and portal 222 (block 706). LIFE system 314-2 may send ID-IP pairs 316 to, for example, firewall 306-2 or IDS 308-2 over database 218, NEF 212, and portal 222. In some implementations, LIFE system 314-2 may periodically check UE database 310-2 for updated ID-IP pairs 316 and forward the updated ID-IP pairs 316 toward the network component.

Process 700 may further include performing security tasks based on the ID-IP pairs 316 at data network 208-1 and/or data center 220 (block 708). For example, when firewall 306-2 receives ID-IP pairs 316 from LIFE system 314-2 through database 218, NEF 212, and portal 222, firewall 306-2 may use the ID-IP pairs 316 to validate whether a UE 202 attempting to connect to data network 208-1 or data center 220 is authorized, by using the ID-IP pairs 316. More specifically, firewall 306-2 may obtain the IP address of the UE 202 and use the IP address to look up its device ID in ID-IP pairs 316. If the device ID matches the ID of a UE 202 that is authorized to access data network 208-1 and/or data center 220, firewall 306-2 may permit the UE 202 to establish a connection with data network 208-1 and/or data center 220.

Process 700 may further include assembling a new list of connected IPs 402 at data network 208-1 or data center 220 (block 710). For example, when firewall 306-2 permits a UE 202 to connect to data network 208-1 and/or data center 220, firewall 306-2 may place the IP address of the UE 202 in a new list of connected IPs 318. After collecting such IP addresses for a predetermined period of time, firewall 306-2 may forward the new connected IPs 318 to LIFE system 314-2 through portal 222, NEF 212, and database 218 (block 712). When LIFE system 314-2 picks up the new connected IPs 318 at database 218, LIFE system 314-2 may store the connected IPs 318 in UE database 310-2.

In addition to storing the connected IP 318 in UE database 310-2, LIFE system 314-2 may use the ID-IP pairs 316 and the connected IPs 318 to update a list of connected devices 404 (block 714) that are identified as the trusted devices. In addition, LIFE system 314-2 may use the trusted device IDs 402 and the list of connected devices 404 to obtain a list of disconnected devices 406 (block 714). In situations where trusted UEs 202 become disconnected from data network 208-1 or data center 220, firewall 306-2 may provide a list of newly disconnected IPs to LIFE system 314-2 through portal 222, NEF 212, and database 218, periodically or on demand. LIFE system 314-2 may obtain the newly disconnected IPs from database 218 to derive or refine its list of disconnected devices 406.

LIFE system 314-2 may perform tasks that are associated with securing data network 208-1 and/or data center 220 (block 716). For example, if the number of disconnected devices 406 is large or increases too quickly, LIFE system 314-2 may alert a network administrator or a network component, to indicate a potential problem with network connections to data network 208-1 or data center 220.

Figure 8:
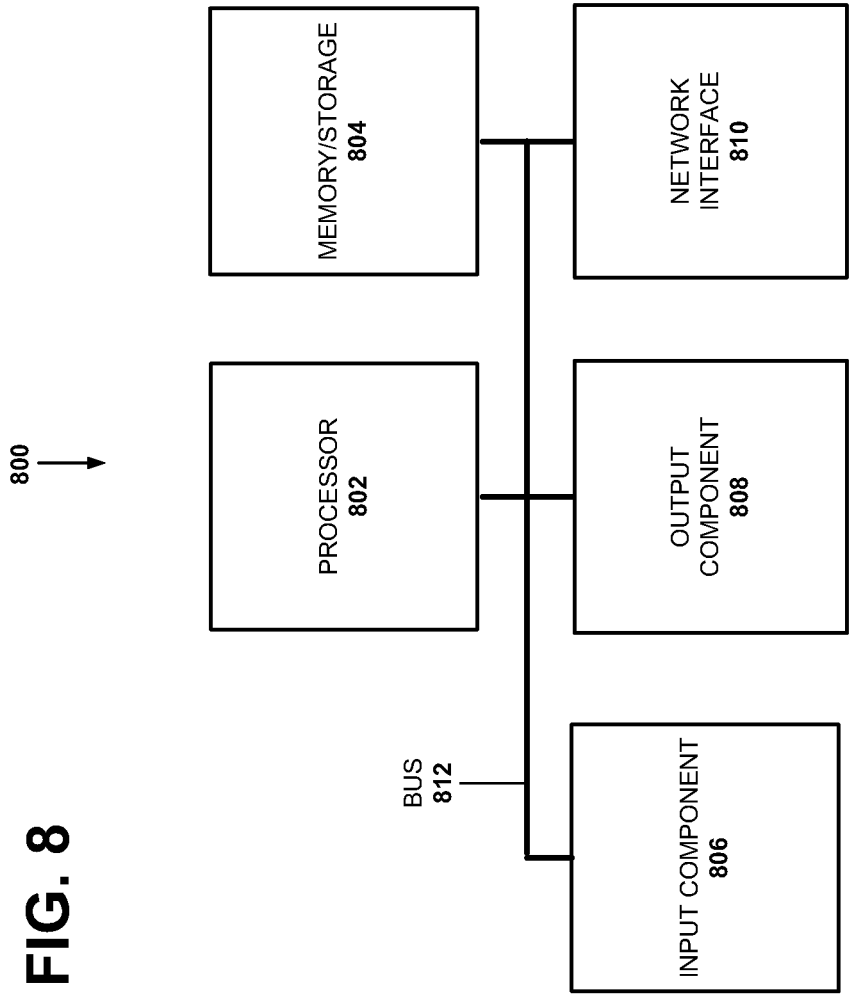
FIG. 8 is a block diagram illustrating exemplary components of a network device.

FIG. 8 depicts exemplary components of an exemplary network device 800. Network device 800 may correspond to or may be included in UEs 202, access stations 210, NEF 212, ADAPT systems 214, ACS 216, database 218, data center 220, portal 222, routers, switches, and/or any of the network components of FIGS. 1, 2, 3, and 6. As shown, network device 800 includes a processor 802, memory/storage 804, input component 806, output component 808, network interface 810, and bus 812. In different implementations, network device 800 may include additional, fewer, different components than the ones illustrated in FIG. 8.

Processor 802 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.).

Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input and output components 806 and 808 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 800.

Network interface 810 may include a transceiver (e.g., a transmitter and a receiver) for network device 800 to communicate with other devices and/or systems. For example, via network interface 810, network device 800 may communicate with access station 210. Network interface 810 may include an Ethernet interface to a LAN, and/or an interface/connection for connecting network device 800 to other devices (e.g., a Bluetooth interface). For example, network interface 810 may include a wireless modem for modulation and demodulation.

Bus 812 may enable components of network device 800 to communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory or storage (e.g., memory/storage 804, when executed by processor 802, may cause processor 802 to perform processes that are described herein. For example, UE 106 and FWA 108 each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are to be regarded in an illustrative rather than restrictive sense. For example, while a series of blocks have been described above with regard to the processes illustrated in FIGS. 5 and 7, the order of the blocks may be modified in other implementations. In addition, non-dependent blocks may represent tasks or actions that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
one or more network devices configured to:
receive a list of identifiers (IDs) of User Equipment devices (UEs) that are authorized to access a provider network and to receive services from a data network different from the provider network;
poll each UE whose ID is in the list of IDs to obtain a list of Internet Protocol (IP) addresses of the UEs;
obtain ID-IP address pairs based on the IP addresses and IDs of the UEs;
receive a request from a UE to connect to the data network, wherein the UE is external to the data network and connected to the provider network;
use the IP address of the UE to find the ID of the UE in the ID-IP address pairs;
validate an authority of the UE to access the data network by determining whether the ID found in the ID-IP address pairs is in the list of IDs; and
if the ID is in the list of IDs of the UEs, permit the UE to establish a connection to the data network; or
if the ID is not in the list of IDs of the UEs, prevent the UE from establishing a connection to the data network.

2. The system of claim 1, wherein the one or more network devices include one or more of:
a firewall; or
an intrusion detection system (IDS).

3. The system of claim 1, wherein the one of more network devices include:
a firewall included in the data network.

4. The system of claim 1, wherein when the one or more network devices poll each UE, the one or more network devices are configured to:
poll the UEs over out-of-band channels established over wireless links between the UEs and the provider network.

5. The system of claim 4, wherein when the one or more network devices poll the UEs over the out-of-band channels, the one or more network devices are configured to:
apply a Simple Network Management Protocol (SNMP) to poll the UEs.

6. The system of claim 1, wherein the one or more network devices are further configured to:
obtain a list of UEs, which are not connected to the data network and whose IDs are in the list of IDs.

7. The system of claim 1, wherein the UEs include one or more of:
a customer premises equipment (CPE) device; or
a fixed wireless access (FWA) device.

8. The system of claim 1, wherein the ID includes one or more of:
a media access control (MAC) address;
an International Mobile Subscriber Identity (IMSI); or a Mobile Subscriber-Integrated Services Digital Network (MSISDN).

9. A method performed by one or more network devices, comprising:

receiving a list of identifiers (IDs) of User Equipment devices (UEs) that are authorized to access a provider network and to receive services from a data network different from the provider network;

polling each UE whose ID is in the list of IDs to obtain a list of Internet Protocol (IP) addresses of the UEs;

obtaining ID-IP address pairs based on the IP addresses and IDs of the UEs;

receiving a request from a UE to connect to the data network, wherein the UE is external to the data network and connected to the provider network;

using the IP address of the UE to find the ID of the UE in the ID-IP address pairs;

validating an authority of the UE to access the data network by determining whether the ID found in the ID-IP address pairs is in the list of IDs; and if the ID is in the list of IDs of the UEs, permitting the UE to establish a connection to the data network; or if the ID is not in the list of IDs of the UEs, preventing the UE from establishing a connection to the data network.

10. The method of claim 9, wherein the one or more network devices include one or more of:

a firewall; or an intrusion detection system (IDS).

11. The method of claim 9, wherein the one or more network devices include:

a firewall included in the data network.

12. The method of claim 9, wherein polling each UE includes:

polling the UEs over out-of-band channels established over wireless links between the UEs and the provider network.

13. The method of claim 12, wherein polling the UEs over the out-of-band channels includes:

applying a Simple Network Management Protocol (SNMP) to poll the UEs.

14. The method of claim 9, further comprising:

obtaining a list of UEs, which are not connected to the data network and whose IDs are in the list of IDs.

15. The method of claim 9, wherein the UEs include one or more of:

a customer premises equipment (CPE) device; or a fixed wireless access (FWA) device.

16. The method of claim 9, wherein the ID includes one or more of:

a media access control (MAC) address;

an International Mobile Subscriber Identity (IMSI); or a Mobile Subscriber-Integrated Services Digital Network (MSISDN).

17. A non-transitory computer-readable medium comprising one or more computer-executable instructions, which when executed by one or more network devices, cause the one or more network devices to:

receive a list of identifiers (IDs) of User Equipment devices (UEs) that are authorized to access a provider network and to receive services from a data network different from the provider network;

poll each UE whose ID is in the list of IDs to obtain a list of Internet Protocol (IP) addresses of the UEs;

obtain ID-IP address pairs based on the IP addresses and IDs of the UEs;

receive a request from a UE to connect to the data network, wherein the UE is external to the data network and connected to the provider network;

use the IP address of the UE to find the ID of the UE in the ID-IP address pairs;

validate an authority of the UE to access the data network by determining whether the ID found in the ID-IP address pairs is in the list of IDs; and if the ID is in the list of IDs of the UEs, permit the UE to establish a connection to the data network; or if the ID is not in the list of IDs of the UEs, prevent the UE from establishing a connection to the data network.

18. The non-transitory computer-readable medium of claim 17, wherein the one or more network devices include one or more of:

a firewall; or an intrusion detection system (IDS).

19. The non-transitory computer-readable medium of claim 17, wherein the one of more network devices include:

a firewall included in the data network.

20. The non-transitory computer-readable medium of claim 17, wherein when the one or more network devices poll each UE, the one or more network devices are configured to:

poll the UEs over out-of-band channels established over wireless links between the UEs and the provider network.

* * * * *